(12) United States Patent
Kremper

(10) Patent No.: US 12,219,946 B2
(45) Date of Patent: Feb. 11, 2025

(54) FISHING ROD SUPPORT STRUCTURE

(71) Applicant: Tackle JAK, Lumberton, NJ (US)

(72) Inventor: Jeffrey Alan Kremper, Lumberton, NJ (US)

(73) Assignee: Tackle JAK, Lumberton, NJ (US)

( * ) Notice: Subject to any disclaimer, the term of this patent is extended or adjusted under 35 U.S.C. 154(b) by 68 days.

(21) Appl. No.: 17/938,166

(22) Filed: Oct. 5, 2022

(65) Prior Publication Data

US 2024/0114886 A1    Apr. 11, 2024

(51) Int. Cl.
*A01K 97/10* (2006.01)

(52) U.S. Cl.
CPC ..................................... *A01K 97/10* (2013.01)

(58) Field of Classification Search
CPC .. A01K 97/10; E04H 12/2215; E04H 12/223; A45B 2023/0012; Y01T 403/7007
See application file for complete search history.

(56) References Cited

U.S. PATENT DOCUMENTS

| | | | | |
|---|---|---|---|---|
| 28,694 | A * | 6/1860 | Smith | B05B 1/00 285/402 |
| 1,256,191 | A * | 2/1918 | Wittkowski | A01K 97/10 248/185.1 |
| 1,283,511 | A * | 11/1918 | Heidtmann | B60R 13/00 362/426 |
| 1,604,496 | A * | 10/1926 | Stevens | B62M 1/14 280/250 |
| 1,923,123 | A * | 8/1933 | Stahlecker | F16B 7/20 384/232 |
| 3,021,101 | A | 2/1962 | Glieebe | |
| 3,339,869 | A * | 9/1967 | Andersen | A01K 97/10 248/156 |
| 3,570,164 | A * | 3/1971 | Tozier | A01K 87/00 43/18.1 R |
| 4,443,963 | A * | 4/1984 | Braaten | A01K 97/10 43/21.2 |

(Continued)

FOREIGN PATENT DOCUMENTS

| | | | | |
|---|---|---|---|---|
| DE | 20309238 U1 * | 9/2003 | ......... | E04H 12/2215 |
| DE | 10347263 A1 | 5/2005 | | |

OTHER PUBLICATIONS

DE 20309238 English translation (Year: 2003).*

*Primary Examiner* — Peter M Poon
*Assistant Examiner* — Marisa V Conlon
(74) *Attorney, Agent, or Firm* — H. Brock Kolls

(57) ABSTRACT

A fishing rod including a fishing rod body and a fishing rod holder is disclosed. The fishing rod holder may include a sleeve configured to attach to the fishing rod body. The sleeve may include a proximal extended edge and a distal extended edge. The fishing rod holder may further include a ground support structure that includes a proximal end and a distal end. The proximal end may be configured to engage with the sleeve via a locking mechanism and the distal end may include a spike configured to be inserted in ground. The ground support structure may be configured to slide along a sleeve longitudinal axis between an original position and an extended position. Further, the proximal extended edge and the distal extended edge may be configured to limit ground support structure movement along the sleeve longitudinal axis.

20 Claims, 6 Drawing Sheets

(56) References Cited

U.S. PATENT DOCUMENTS

| | | | | |
|---|---|---|---|---|
| 5,044,597 A * | 9/1991 | Walczak | ................ | A01K 97/10 |
| | | | | 248/512 |
| 5,639,057 A * | 6/1997 | Yeomans | ................. | E06C 7/46 |
| | | | | 248/156 |
| 6,220,260 B1 * | 4/2001 | Sachs | ................. | E04H 12/2215 |
| | | | | 135/15.1 |
| 7,216,453 B1 * | 5/2007 | Higgins | ................. | A01K 97/10 |
| | | | | 43/21.2 |
| 8,057,329 B2 * | 11/2011 | Cusimano | .............. | A63B 61/02 |
| | | | | 473/492 |

* cited by examiner

FISHING ROD SUPPORT STRUCTURE

TECHNICAL FIELD

The present disclosure relates to a fishing rod, and more specifically to a fishing rod having a support structure for locking the fishing rod to ground.

BACKGROUND

Surf fishermen have a need to use their hands for purposes other than fishing. For example, a surf fisherman may use his hands to land fish on beach, change the lure or tackle, correct fishing rod angle, or take regular breaks. During such times, the surf fisherman typically places the fishing rod on ground or boat surface, or holds the fishing rod in an uncomfortable position.

Resting the fishing rod on ground or against a support may not be secure and may damage the fishing reels. For example, when the surf fisherman places the fishing rod on the ground, sand may get into the reel and may cause damage. Similarly, the fishing rod may fall off due to wind when the fishing rod is placed against a support without a secure fastening means.

There exists conventional fishing rod holders that can hold/secure the fishing rod when the fishing rod is not in use. However, the surf fisherman has to carry the fishing rod holder, which is an additional equipment, while travelling for fishing. This may cause inconvenience to the fisherman and may take cargo space as well.

Thus, there is a need for a fishing rod holder that is convenient to use and which does not interfere with the fisherman's casting ability or affect fishing rod's functionalities.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed towards a fishing rod having a support structure for securing the fishing rod in a vertical position on ground. A surf fisherman may use the support structure to secure the fishing rod on the ground, when the fisherman may not be fishing and may be engaged in other activities (e.g., taking breaks, correct fishing rod angle, etc.). The support structure may be a part of the fishing rod or may be integrated with the fishing rod to form a unitary structure. In some aspects, the support structure may include a sleeve and a blade. The sleeve may be a hollow cylindrical body and configured to engage with the fishing rod. The blade may be engaged with the sleeve and configured to slide vertically up and down along a sleeve longitudinal axis. Specifically, the fisherman may keep the blade in an original position (e.g., an upward position) when the fisherman may be performing fishing activities. The fisherman may slide the blade in an extended position (e.g., a downward position) and secure the fishing rod in the ground, when the fisherman performs activities other than fishing.

In some aspects, the sleeve may include collars at sleeve's edges to limit blade movement between the collars, along the sleeve longitudinal axis. In further aspects, the sleeve and the blade may be engaged via a locking mechanism. The locking mechanism may include male fastening members in the sleeve and corresponding female fastening members in the blade. In alternate aspects, the locking mechanism may include at least one male fastening members in the blade and female fastening members in the sleeve. The locking mechanism may include pegs and notches, thumb screws and holes, or concave groove and lock arrangement.

In some aspects, the sleeve may secure the fishing rod by using C-shaped clamp(s). In further aspects, the sleeve and the fishing rod may be secured by using fastening members, such as thumbscrews.

The present disclosure provides various advantages over conventional fishing rods. For instance, the present disclosure provides a reliable way for the fisherman to secure the fishing rod in the vertical position in the ground, giving the fisherman freedom and flexibility to perform tasks other than active fishing. In addition, the support structure may be integrated with fishing rod of any length. Further, the blade may easily slide upwards or downwards and does not interfere with the fisherman's casting ability or other fishing rod functionalities. Furthermore, the fisherman need not carry additional equipment to secure the fishing rod to the ground and does not require a separate fishing rod holder.

Illustrative Embodiments

The disclosure will be described more fully hereinafter with reference to the accompanying drawings, in which example embodiments of the disclosure are shown, and not intended to be limiting.

Figure 1:
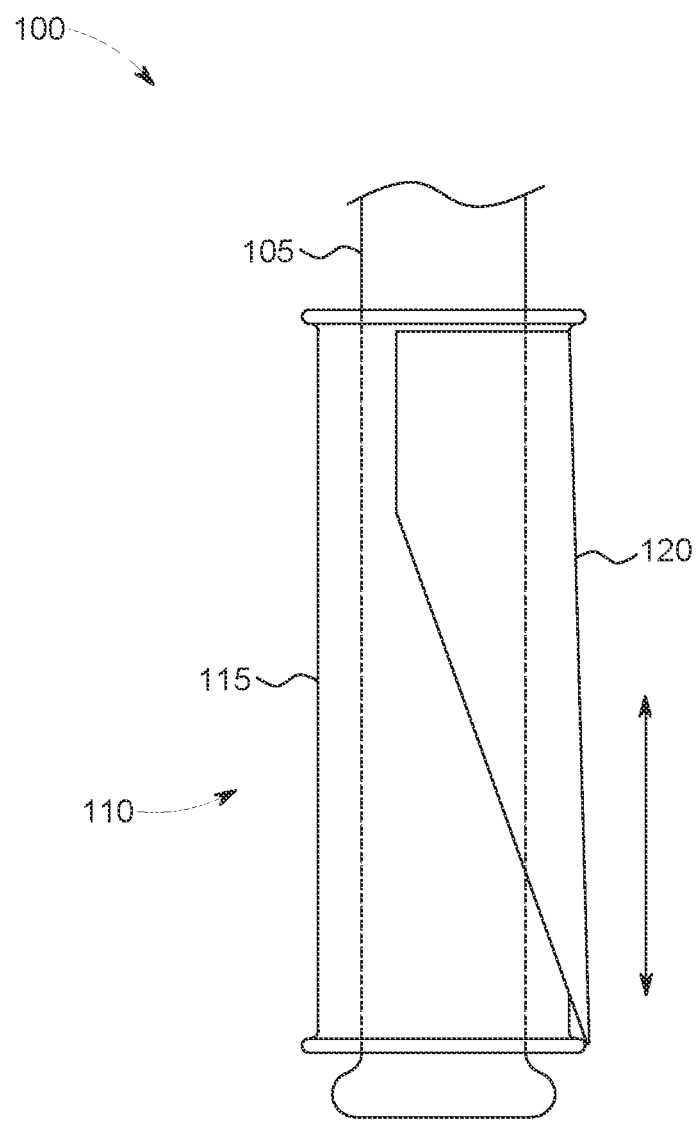
FIG. 1 depicts an example fishing rod in accordance with the present disclosure.

FIG. 1 depicts an example fishing rod 100 in accordance with the present disclosure. The fishing rod 100 may include a fishing rod body 105 and a fishing rod holder 110. In some aspects, the fishing rod holder 110 may affixed to the fishing rod body 105. In other aspects, the fishing rod body 105 and the fishing rod holder 110 may form an integrated unitary structure.

The fishing rod body 105 may be of any type including, but not limited to, spin fishing rod, spincast/casting rod, telescoping fishing rod, fly fishing rod, ultralight fishing rod, surf fishing rod, trolling fishing rod and the like. The fishing rod body 105 may be made of graphite, fiberglass, bamboo rods and/or the like. Furthermore, the fishing rod body 105 may be of any length and thickness. In some aspects, the fishing rod body 105 may be a solid cylindrical body.

The fishing rod holder 110 may be configured to hold/secure the fishing rod body 105 on ground/sand. For example, a surf fisherman may use the fishing rod holder 110 to secure the fishing rod body 105 on beach sand, when the surf fisherman is engaged in other activities (e.g., taking a break, correcting a fishing rod angle and/or the like). In some aspects, the fishing rod holder 110 may include a sleeve 115 and a ground support structure 120 (e.g., a blade/spike, hereinafter referred to as a blade 120). The sleeve 115 may have a hollow structure that may be configured to engage with the fishing rod body 105. In particular, the sleeve 115 may be configured to attach to a fishing rod body outer surface. In one or more aspects, the blade 120 may be configured to engage with the sleeve 115 via a locking mechanism (not shown in FIG. 1).

As described above, the sleeve 115 may be hollow from inside to hold/secure the fishing rod body 105. In one or more aspects, the sleeve 115 may be cylindrical in shape, having an interior surface and an exterior surface. The sleeve interior surface may hold the fishing rod body outer surface. In some aspects, the sleeve 115 may of any other shape that complements a fishing rod body outer surface shape. In further aspects, the interior surface and the exterior surface may be smooth. Alternatively, the exterior surface may be curved or in a zigzag shape, which may assist the fisherman in holding the fishing rod holder 110.

The sleeve 115 may be made of any material such as rubber, plastic, wood and the like. A sleeve diameter may be greater than a fishing rod body thickness/diameter to secure the fishing rod body 105 inside the sleeve 115. In an exemplary embodiment, the sleeve diameter may be 30-70% greater than the fishing rod body diameter. Further, a sleeve length may depend on a fishing rod body length. For example, the sleeve length may be greater for a long fishing rod body and may be smaller for a short fishing rod body.

In some aspects, the blade 120 may be configured to engage or attach to the sleeve exterior surface and may be configured to slide up or down along a sleeve longitudinal axis. For example, the blade 120 may slide down to lock the fishing rod 100 in the ground and may slide up when the surf fisherman needs to use the fishing rod 100 for fishing activities. In some aspects, a blade length may be same or equivalent to the sleeve length. Thus, the blade 120 may not protrude from a sleeve distal end, when the surf fisherman slides the blade 120 up to use the fishing rod 100.

Figure 2:
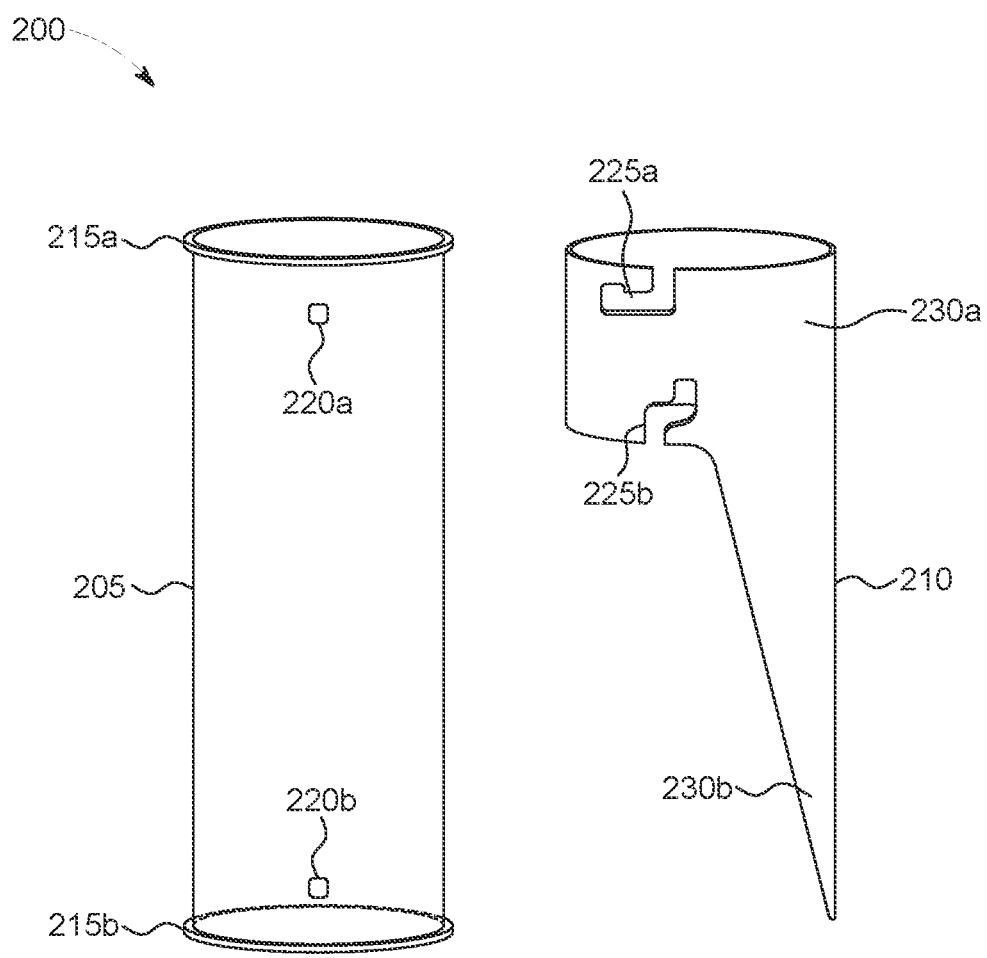
FIG. 2 depicts an exemplary embodiment of a fishing rod holder in accordance with the present disclosure.

In further aspects, the blade 120 may have a proximal end and a distal end (shown in FIG. 2). In some aspects, the surf fisherman may insert the blade distal end to the ground, which enables locking the fishing rod 100 in the ground. Specifically, the blade distal end may be a sharpened end (or a spike) that may be configured to secure the fishing rod 100 to the ground/sand. Further, the blade proximal end may be configured to engage with the sleeve exterior surface and slide along the sleeve exterior surface. In some aspects, the blade proximal end may be a circular or C-shaped structure to enclose the sleeve 115. In one or more aspects, the blade proximal end may cover a portion of a sleeve circumference. For example, as shown in FIG. 1, the blade proximal end may cover half the sleeve circumference. In other aspects, the blade proximal end may cover/enclose an entire sleeve circumference.

As described above, the blade 120 may be configured to engage with the sleeve 115 such that the blade 120 may slide between an original position (e.g., an "up" blade locked/secured position) and an extended position (e.g., a "down" blade locked/secured position) along the sleeve longitudinal axis. For example, the surf fisherman may keep the blade 120 in the original position when the surf fisherman performs activities associated with fishing. Further, the surf fisherman may slide the blade 120 to the extended position and insert the fishing rod 100 inside the ground, when the surf fisherman performs activities other than fishing. The blade's sharpened end may allow the fishing rod 100 to stick/lock to the ground so that the surf fisherman may perform other activities. Further, the surf fisherman may slide the blade 120 back to the original position when the surf fisherman wants to use the fishing rod 100 again for fishing activities. In this manner, according to the present disclosure, the surf fisherman does not have to carry any additional equipment to hold/secure the fishing rod 100 when the rod is not in use. In addition, the fishing rod holder 110 does not interfere with the fishing activities, as the fishing rod holder 110 is a part of the fishing rod 100.

FIG. 2 depicts an exemplary embodiment of a fishing rod holder 200 (same as the fishing rod holder 110) in accordance with the present disclosure. As discussed above, the fishing rod holder 200 may be affixed to (or be a part of) a fishing rod (same as the fishing rod 100). The fishing rod holder 200 may include a sleeve 205 and a blade 210.

In some aspects, the sleeve 205 may be cylindrical in shape and may be hollow from inside. In further aspects, the sleeve 205 may have an open proximal end (e.g., at a top to receive the fishing rod body 105) and a closed distal end (e.g., at a bottom). In another aspect, the sleeve 205 may be open from the distal end as well. The open end(s) may be circular in shape, or in a shape that complements the fishing rod body outer surface shape. The closed end may be flat or curved to enclose a fishing rod butt. In one or more aspects, the closed end may be shaped corresponding to a fishing rod butt shape and may have a diameter greater than a fishing rod butt diameter.

The sleeve 205 may have a sleeve proximal extended edge 215a and a sleeve distal extended edge 215b. In some aspects, a sleeve proximal extended edge diameter may be same as or equivalent to a sleeve distal extended edge diameter. Alternatively, the sleeve proximal extended edge diameter may be different from the sleeve distal extended edge diameter. In further aspects, the sleeve proximal extended edge 215a and the sleeve distal extended edge 215b may have a diameter greater than the sleeve diameter. The sleeve proximal extended edge 215a and the sleeve distal extended edge 215b may act as a barrier or a stopper to limit the blade movement along the sleeve exterior surface. In other words, the sleeve proximal extended edge 215a and the sleeve distal extended edge 215b may prevent the blade 210 from falling off the sleeve 205, when the blade slides along the sleeve longitudinal axis (as described above). In some aspects, the sleeve proximal extended edge 215a and the sleeve distal extended edge 215b may be turned upwards and rounded, which may act as the barrier/stopper. In further aspects, the sleeve proximal extended edge 215a and the sleeve distal extended edge 215b may be collars having ring shape.

The blade 210 may include a blade proximal end 230a and a blade distal end 230b. The blade proximal end 230a may be C-shaped or circular that may surround or enclose the sleeve exterior surface. A blade proximal end diameter may be greater than a sleeve outer surface diameter. Further, in some aspects, the blade proximal end diameter may be less than the sleeve proximal extended edge diameter and the sleeve distal extended edge diameter. Thus, in this arrangement, the blade 210 may slide on the sleeve exterior surface but the blade movement is restricted/limited between the sleeve proximal extended edge 215a and the sleeve distal extended edge 215b. In other words, the blade 210 may not move above the sleeve proximal extended edge 215a and below the sleeve distal extended edge 215b.

In some aspects, the blade distal end 230b may be a rod having sharpened end (e.g., having a spike at the end) which may be configured to engage with the ground/sand. The rod be flat, circular, curved, or any other shape. In some aspects, a blade proximal end length may be less than a blade distal end length. This arrangement provides a secure mechanism to hold the fishing rod 100 in the ground/sand as a substantial length may be inserted in the ground. Further, the blade proximal end length and the blade distal end length may vary, based on the fishing rod body length.

The sleeve 205 may be engaged with the blade 210 via a locking mechanism 220a interconnected with 225a or 220b interconnected with 225b. In some aspects, the locking mechanism may include a plurality of male fastening members 220a, 220b on the sleeve 205 and a corresponding plurality of female fastening members 225a, 225b on the blade 210. In some aspects, the plurality of male fastening members 220a, 220b may include pegs 220a, 220b on the sleeve 205. The peg 220a may be located near the sleeve proximal extended edge 215a and the peg 220b may be located near the sleeve distal extended edge 215b. In further aspects, the plurality of female fastening members 225a, 225b may include notches 225a, 225b on the blade 210. The notches 225a and 225b may be located in the blade proximal end 230a. In other aspects, the notches 225a and 228b may be located in the blade distal end. In some aspects, the notches 225a and 225b may be L-shaped, circular, or any other shape. Each of the notches 225a and 225b may further include an open end through which the pegs 220a and 220b may be inserted or slid into the notches 225a and 225b. Each of the notches 225a and 225b may further include a closed end that restricts blade movement when the pegs 220a and 220b are locked in the notches 225a and 225b.

A person ordinarily skilled in the art may appreciate that the sleeve 205 and the blade 210 may include additional pegs and notches, which may assist in adjusting a blade length that may be inserted in the ground. Further, a number of pegs or notches may depend on the fishing rod length and/or the fishing rod holder length.

In some aspects, the peg 220a (located near the sleeve proximal extended edge 215a) may be engaged with the notch 225a in the blade original position. In the original position, the blade proximal end 230a may touch (or may be located near to) the sleeve proximal extended edge 215a. In further aspects, the surf fisherman may disengage the peg 220a with the notch 225a and may engage the peg 220b with the notch 225b in the blade extended position. In the extended position, the blade proximal end 230a may touch (or may be located near to) the sleeve distal extended edge 215b. At this position, the blade distal end 230b may protrude from the sleeve 205 and may be inserted in the ground (which may assist in securely holding the fishing rod 100 in the ground). This way, the blade 210 may be moved between the original position and the extended position.

In additional aspects, the locking mechanism may include at least one male fastening member on the blade 210 and a corresponding plurality of female fastening members on the sleeve 205. In some aspects, the at least one male fastening member may include peg(s) on the blade 210. In further aspects, the plurality of female fastening members may include notches on the sleeve 205.

In other aspects, the locking mechanism may include at least one screw (e.g., a thumbscrew) that may engage the blade 210 on the sleeve 205. In yet another aspect, the locking mechanism may include a concave groove and lock arrangement (shown in FIG. 3) to engage the blade 210 on the sleeve 205. For example, the sleeve 205 may include a plurality of vertical and horizontal concave grooves and the blade 210 may include one or more protrusions. The one or more protrusions may lock inside the grooves, which may engage the blade 210 on the sleeve 205.

In further aspects, the fishing rod holder 200 may include two blades that may be located on opposite sleeve exterior surfaces. The use of two blades may provide additional support and rigidity in securing the fishing rod 100 in the ground. Second blade locking mechanism and other structural details may be similar to the locking mechanism and structural details of the blade 210.

Figure 3:
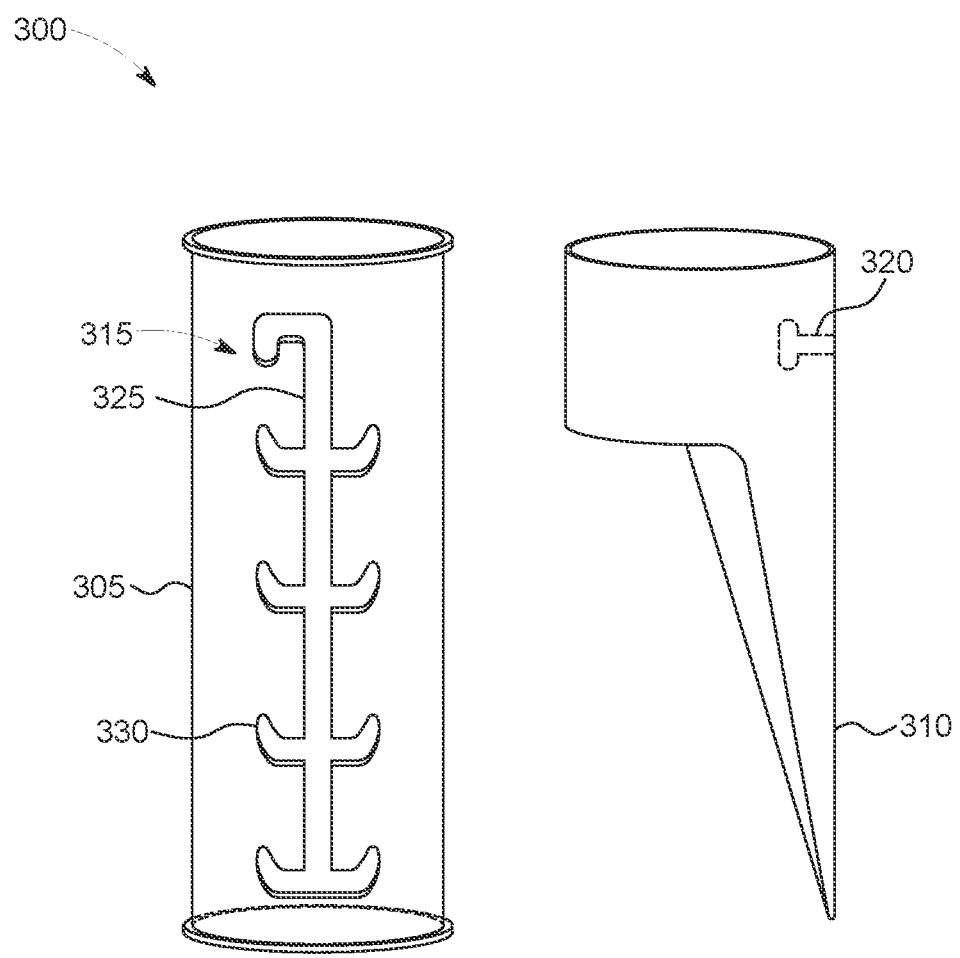
FIG. 3 depicts an example locking mechanism of a fishing rod holder in accordance with the present disclosure.

FIG. 3 depicts an example locking mechanism of a fishing rod holder 300 in accordance with the present disclosure. In particular, FIG. 3 depicts a sleeve 305 (same as the sleeve 205) and a blade 310 (same as the blade 210). In accordance with the present disclosure, the fishing rod holder 300 may include a concave groove and lock arrangement to engage the blade 310 on the sleeve 305. The concave groove and lock arrangement may be configured to position the blade 310 between the original position and the extended position, as discussed in conjunction with FIG. 2. In other words, the concave groove and lock arrangement may be configured to "adjust" a blade length that may be inserted in the ground.

In particular, the fishing rod holder 300 may include a concave groove structure 315 in the sleeve 305. The concave groove structure 315 may be a female fastening member and may have concave cavities. In some aspects, the concave groove structure 315 may be formed on the sleeve exterior surface and may not be located on the sleeve interior surface (that houses the fishing rod body 105).

In further aspects, the blade 310 may include a corresponding locking mechanism 320 interconnected with 315. In particular, the blade 310 may include corresponding male fastening member(s). In one or more aspects, the male fastening member(s) may be peg(s) 320 or other fastening members with protrusion(s). The peg(s) 320 may be placed in the blade proximal end 230a. In alternative embodiments, the blade 310 may include the female fastening member (like the concave groove structure 315) along the blade length and the sleeve 305 may include the corresponding male fastening member (e.g., pegs) that may protrude from the sleeve exterior surface.

In accordance with the present disclosure, the concave groove structure 315 may include a vertical portion 325 and a plurality of horizontal portions 330. The horizontal portions 330 may be placed in a layered arrangement through the sleeve length to adjust blade length in the ground. In some aspects, the plurality of horizontal portions may be arranged in layers that are placed at same distance. The plurality of horizontal portions may have concave shape. In the original blade position, the blade 310 may be mounted at a top portion of the concave groove structure 315. When the surf fisherman needs to position the fishing rod 100 on the ground, the surf fisherman man may unlock the blade original position and may slide the blade 310 down via the vertical portion 325. The surf fisherman may decide whether the blade 310 is to be locked at the extended position (lower most position) or any intermediate position. In some aspects, the surf fisherman may lock the blade 310 in any horizontal portion (i.e., at any desired length). In one or more aspects, the surf fisherman may lock the blade 310 in the horizontal portion by moving the blade 310 left or right in the horizontal portion.

A person ordinary skilled in the art may appreciate that a concave groove structure shape as described above is an exemplary shape and may be changed to adjust the blade position between the original position and the extended position, without departing from the present disclosure scope.

Figure 4A:
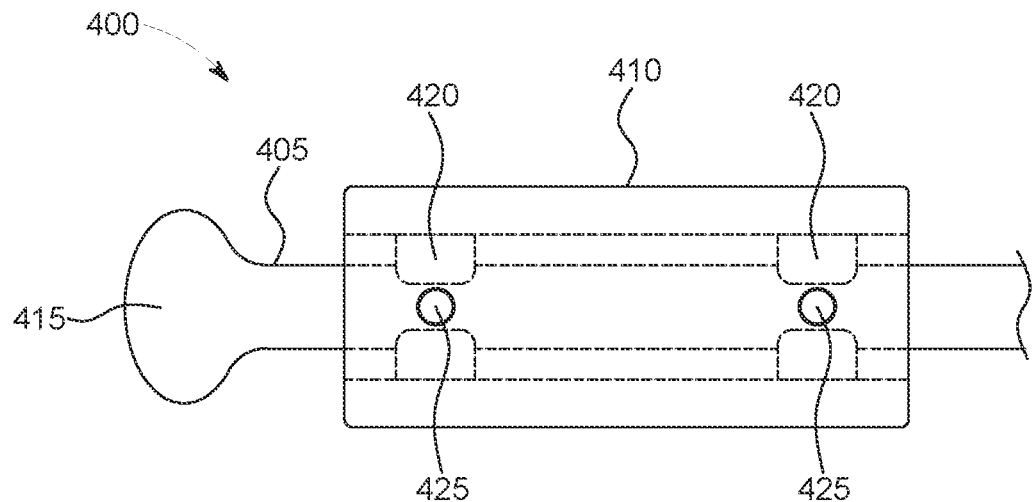
FIGS. 4A and 4B depict a first view and a second view of the fishing rod holder in accordance with the present disclosure.
Figure 4B:
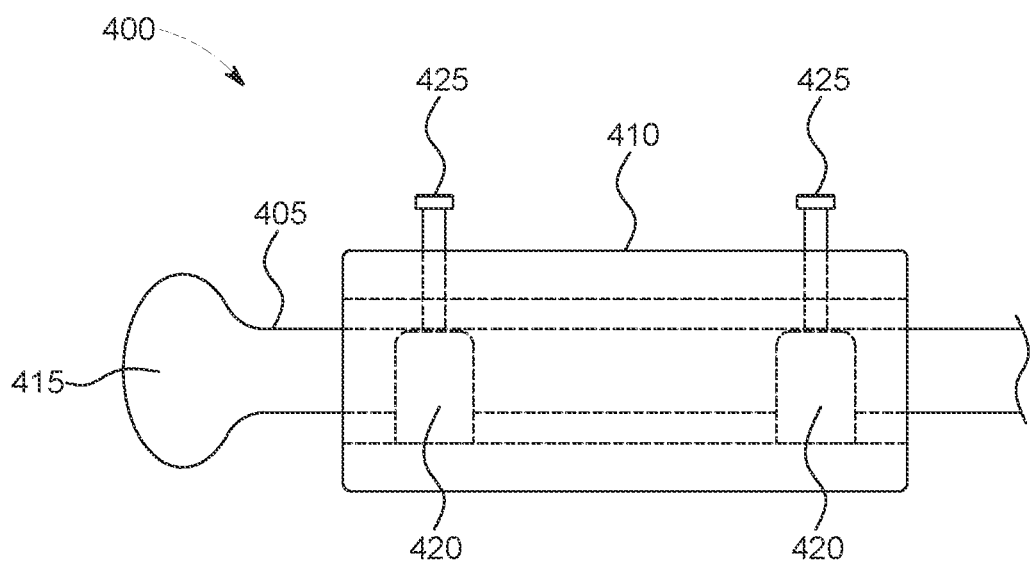

FIGS. 4A and 4B depict a first view and a second view of a fishing rod holder 400 in accordance with the present disclosure. Specifically, FIG. 4A depicts a fishing rod holder lateral bottom view (or a lateral top view) and FIG. 4B depicts a fishing rod holder lateral side view. As discussed above, the fishing rod holder 400 may be affixed to (or be a part of) a fishing rod 405 (same as the fishing rod 100). The fishing rod holder 400 may include a sleeve 410 and a blade (not shown in FIGS. 4A and 4B) that are engaged via a locking mechanism.

In some aspects, the sleeve 410 may be cylindrical in shape and may be hollow from inside. In further aspects, the sleeve 410 may have an open proximal end and a closed distal end (as described above). The closed end may be flat or curved to enclose a fishing rod butt 415. In one or more aspects, the closed end may be shaped corresponding to the fishing rod butt shape and may have a diameter greater than the fishing rod butt diameter.

In another aspect, the sleeve 410 may have both the proximal and the distal ends open (as shown in FIGS. 4A and 4B). In this case, the fishing rod butt 415 may protrude from the sleeve distal end.

The sleeve 410 may further include an attaching mechanism to hold the fishing rod 405 inside the sleeve 410. In other words, the sleeve 410 may secure the fishing rod 405 and may not allow the fishing rod 405 to move off its position (such as due to wind or when the surf fisherman uses the fishing rod 405 to fish). In some aspects, the attaching mechanism may include at least one clamp 420 that may be affixed to a sleeve inner surface. In some aspects, the attaching mechanism may include two clamps 420. One clamp 420 may be located near the sleeve proximal edge (e.g., the sleeve proximal extended edge 215a) and another clamp 420 may be located near the sleeve distal edge (the sleeve distal extended edge 215b). In some aspects, the sleeve 410 may include additional clamps between the two clamps 420.

In further aspects, the two clamps 420 may be affixed to a same sleeve lateral side, as shown in FIGS. 4A and 4B. In other aspects, the two clamps 420 may be affixed on opposite sleeve sides. Further, the clamps 420 may be made of plastic or rubber and may be flexible to open and receive the fishing rod 405. In addition, the clamps 420 may be configured to close and lock the fishing rod 405 after receiving the fishing rod 405. In particular, the clamps 420 may be configured to open to receive the fishing rod butt 415 and then close to restrict the fishing rod movement. In some aspects, the clamps 420 may be C-shaped or any other shape that may securely hold the fishing rod 405.

Further, the fishing rod 405 and the sleeve 410 may be additionally secured with each other via one or more thumbscrews 425 or any other similar fastener. Specifically, in this case, the sleeve 410 may have one or more holes to receive the one or more thumbscrews 425 and securely fasten the fishing rod 405. In some aspects, the one or more thumbscrews 425 may secure the fishing rod 405 via an open end of the clamp 420 (e.g., via a C-shaped clamp open end).

In additional aspects, the blade 210 may engage with the sleeve 410 by using the same thumbscrews (e.g., the thumbscrews 425) that engage the fishing rod 405 with the sleeve 410. Specifically, as discussed above, the blade 210 may engage with the sleeve 410 via the locking mechanism. In some aspects, the locking mechanism may include the thumbscrews 425. In this case, the blade 210 may include corresponding holes to receive the thumbscrews 425. The thumbscrews 425 may pass through the blade holes and securely fasten the blade 210 and the fishing rod 405 with the sleeve 410.

FIG. 4B depicts a side view of the thumbscrews 425 inserted through the sleeve 410. Although FIGS. 4A and 4B show two thumbscrews 425, a person ordinarily skilled in the art may appreciate that additional thumbscrews may be inserted through the sleeve 410, depending on a number of clamps in the sleeve 410. In yet another aspect, only one thumbscrew 425 (that may be located either near the sleeve proximal extended edge 215a or near the sleeve distal extended edge 215b) may be inserted through the sleeve 410.

Figure 5:
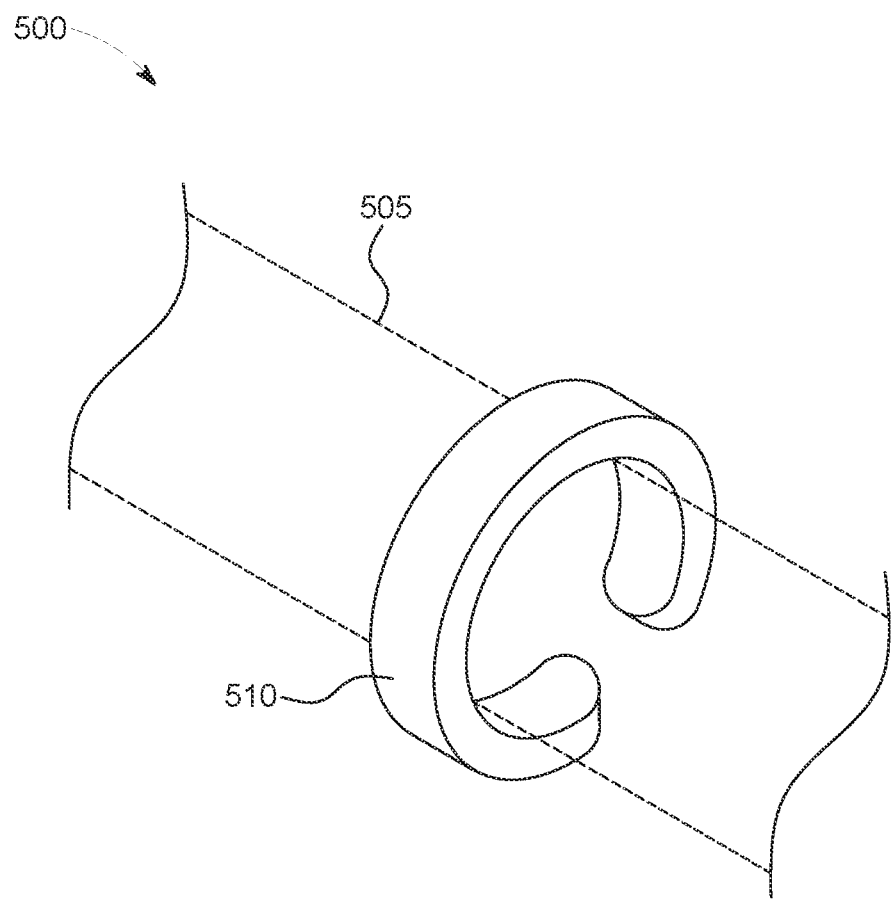
FIG. 5 depicts a third view of the fishing rod holder in accordance with the present disclosure.

FIG. 5 depicts a third view of the fishing rod holder 500 in accordance with the other exemplary embodiment of the present disclosure. In particular, FIG. 5 depicts an isometric lateral top view of the fishing rod holder 500 (same as the fishing rod holder 400). FIG. 5 depicts a fishing rod 505 that may be inserted in a sleeve (not shown in FIG. 5). As discussed above, the fishing rod 505 may be secured inside the sleeve by using a clamp 510 (same as the clamp 420). The clamp 510 may be C-shaped having an open end. In some aspects, the clamp 510 may cover a portion of a fishing rod circumference, e.g., 65-95% of the fishing rod circumference.

As shown in FIG. 5, there may be only one clamp 510 to hold the fishing rod 505. The clamp 510 may be placed in a middle portion along the sleeve length, or at any other position along the sleeve length. In other aspects, there may be more than one clamp to hold the fishing rod 505. The clamp 510 may be flexible and may be configured to receive or attach to fishing rods of varying thickness/diameter.

Figure 6:
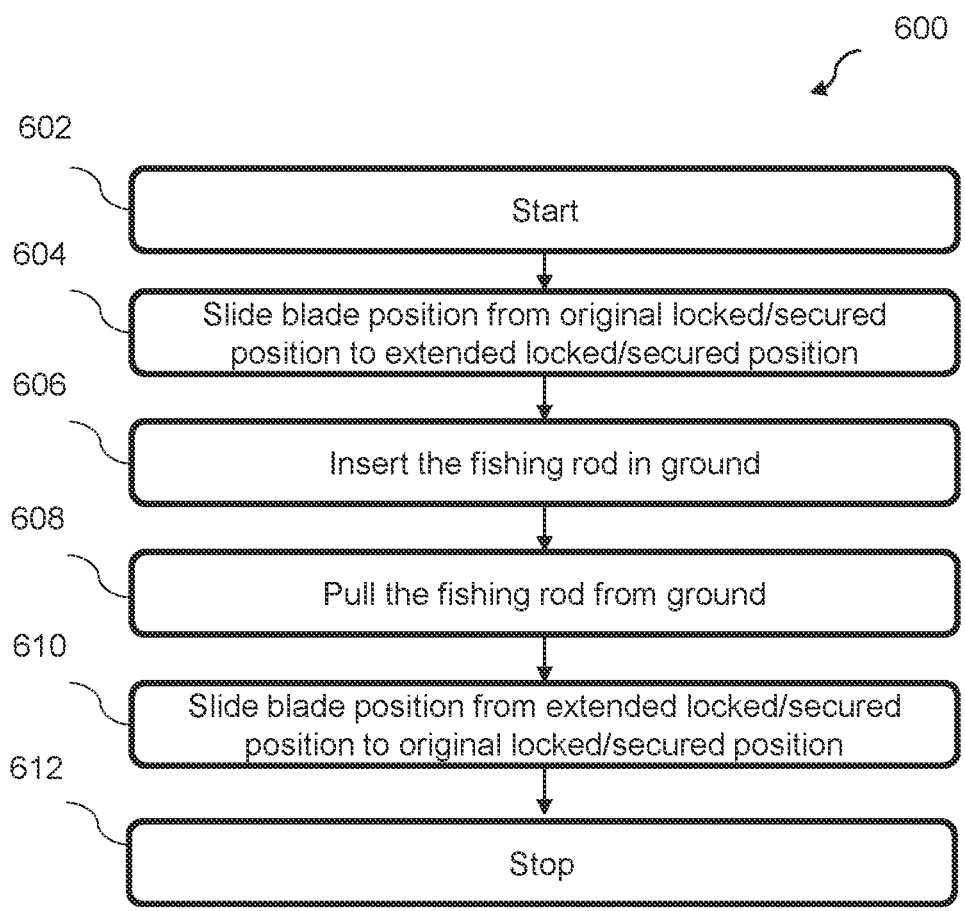
FIG. 6 illustrates a method to secure a fishing rod on ground/sand, in accordance with the present disclosure.

FIG. 6 illustrates a method 600 to secure a fishing rod (e.g., the fishing rod 100) on ground/sand, in accordance with the present disclosure. FIG. 6 may be described with continued reference to prior figures, including FIGS. 1-5. The following process is exemplary and not confined to the steps described hereafter. Moreover, alternative embodiments may include more or less steps that are shown or described herein and may include these steps in a different order than the order described in the following example embodiments. As discussed above, the fishing rod 100 may be attached to and form an integrated unitary structure with the fishing rod holder 110 that may include a sleeve and blade arrangement.

Referring to FIG. 6, at step 602, the method 600 may commence. At step 604, the method 600 may include sliding the blade 120 from the original locked/secured position to the extended locked/secured position, when the surf fisherman performs activities other than fishing. The blade original locked/secured position and extended locked/secured position details may be understood in conjunction with above figures. In some aspects, the surf fisherman may slide the blade 120 by locking/unlocking the blade 120 using the locking mechanism described above. In some aspects, the surf fisherman may lock the blade 120 at a position between the original locked/secured position and the extended locked/secured position, depending on the blade length that the surf fisherman may require to hold the fishing rod 100 in the ground/sand.

At step 606, the method 600 may include inserting the fishing rod 100 in the ground, via the fishing rod holder 110. In other words, the fishing rod 100 may be inserted into the ground via the blade distal end (having spike at the end). The spike may create cavity in the ground and the blade 120 may be inserted into the ground to secure the fishing rod 100 in vertical position in the ground.

As discussed above, the surf fisherman may insert the fishing rod 100 in the ground to perform activities other than fishing. When the surf fisherman needs to use the fishing rod 100 for fishing, the surf fisherman may pull the fishing rod 100 from the ground at step 608. At step 610, the surf fisherman may slide the blade 120 back from the extended locked/secured position to the original locked/secured position, so that the fishing rod holder 110 does not interfere with the fisherman's fishing activity. The method 600 stops at step 612.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A fishing system, comprising:
    a fishing rod body; and
    a rod holder, comprising:
        a sleeve configured to secure the fishing rod body, the sleeve comprising a proximal extended edge around the circumference of a proximal end of the sleeve, and a distal extended edge around the circumference of a distal end of the sleeve, wherein a sleeve longitudinal axis extends from the proximal end to the distal end of the sleeve;
        at least one peg attached to the sleeve; and
        a ground support that secures the sleeve in a slidable and rotatable manner, the ground support extending from a proximal end to a distal end along a ground support longitudinal axis, the ground support comprising:
            a cuff extending from the proximal end of the ground support, the cuff having a proximal edge around the circumference of the proximal end of the ground support, and a distal edge extending around a distal end of the cuff; and
            a spike that extends from the distal end of the cuff to the distal end of the ground support, the spike configured to be inserted into the ground;
            a first curvilinear notch that has an open end at the proximal edge of the cuff to receive the at least one peg, the first curvilinear notch comprising at least one horizontally orientated portion and more than one vertically orientated portions with respect to the ground support longitudinal axis, wherein the at least one peg is configured to interconnect with the first curvilinear notch by traversing the at least one horizontally orientated portion and the more than one vertically orientated portions to form a first locking mechanism that rigidly holds the sleeve in a first position relative to the ground support;
            a second curvilinear notch that has an open end at the distal edge of the cuff to receive the at least one peg, the second curvilinear notch comprising at least one horizontally orientated portion and more than one vertically orientated portions with respect to the ground support longitudinal axis, wherein the at least one peg is configured to interconnect with the second curvilinear notch by traversing the at least one horizontally orientated portion and the more than one vertically orientated portions to form a second locking mechanism that rigidly holds the sleeve in a second position relative to the ground support;
        wherein the length of the rod holder is shorter when the sleeve is in the first position and is longer when the sleeve is in the second position.

2. The fishing system of claim 1, wherein the sleeve comprises at least one clamp to secure the fishing rod body inside the sleeve.

3. The fishing system of claim 2, wherein the at least one clamp is C-shaped clamp.

4. The fishing system of claim 2, wherein the sleeve and the fishing rod body are further secured via at least one screw, and wherein the at least one screw secures the sleeve and the fishing rod body via by way of an opening of the at least one clamp.

5. The fishing system of claim 1, wherein the at least one peg is configured to interconnect with the first curvilinear notch to secure the ground support in a retracted position for storage.

6. The fishing system of claim 1, wherein the sleeve is cylindrical in shape.

7. The fishing system of claim 1, wherein the shape of the first curvilinear notch is different from the shape of the second of the curvilinear notch.

8. The fishing system of claim 1, wherein the length of the ground support along the ground support longitudinal axis is the same as the length of the sleeve length along the sleeve longitudinal axis.

9. The fishing system of claim 1, wherein the sleeve is open from the proximal end of the sleeve and closed from the distal end of the sleeve.

10. The fishing system of claim 1, wherein the sleeve further comprises a first collar extending around the proximal edge and a second collar extending around the distal edge, wherein the ground support is slidable relative to the sleeve between the first collar and the second collar, and wherein the first collar and the second collar restrict motion of the ground support to prevent the ground support from being separated from the sleeve.

11. The fishing system of claim 1, wherein the at least one peg comprises a first peg near the proximal edge of the sleeve and a second peg near the distal edge of the sleeve.

12. The fishing system of claim 11, wherein, when the sleeve is in the first position, the first peg interconnects with the first curvilinear notch, and the first position is a retracted position for storage.

13. A fishing rod holder for supporting a fishing rod, the fishing rod holder comprising:
  a sleeve configured to secure the fishing rod body, the sleeve comprising a proximal extended edge around the circumference of a proximal end of the sleeve, and a distal extended edge around the circumference of a distal end of the sleeve, wherein a sleeve longitudinal axis extends from the proximal end to the distal end of the sleeve;
  at least one peg attached to the sleeve; and
  a ground support that secures the sleeve in a slidable and rotatable manner, the ground support extending from a proximal end to a distal end along a ground support longitudinal axis, the ground support comprising:
    a cuff extending from the proximal end of the ground support, the cuff having a proximal edge around the circumference of the proximal end of the ground support, and a distal edge extending around a distal end of the cuff; and
    a spike that extends from the distal end of the cuff to the distal end of the ground support, the spike configured to be inserted into the ground;
    a first curvilinear notch that has an open end at the proximal edge of the cuff to receive the at least one peg, the first curvilinear notch comprising at least one horizontally orientated portion and more than one vertically orientated portions with respect to the ground support longitudinal axis, wherein the at least one peg is configured to interconnect with the first curvilinear notch by traversing the at least one horizontally orientated portion and the more than one vertically orientated portions to form a first locking mechanism that rigidly holds the sleeve in a first position relative to the ground support;
    a second curvilinear notch that has an open end at the distal edge of the cuff to receive the at least one peg, the second curvilinear notch comprising at least one horizontally orientated portion and more than one vertically orientated portions with respect to the ground support longitudinal axis, wherein the at least one peg is configured to interconnect with the second curvilinear notch by traversing the at least one horizontally orientated portion and the more than one vertically orientated portions to form a second locking mechanism that rigidly holds the sleeve in a second position relative to the ground support;
    wherein the length of the rod holder is shorter when the sleeve is in the first position and is longer when the sleeve is in the second position.

14. The fishing rod holder of claim 13, wherein the sleeve comprises at least one clamp to secure a fishing rod body inside the sleeve.

15. The fishing rod holder of claim 14, wherein the at least one clamp is C-shaped clamp.

16. The fishing rod holder of claim 13, wherein the shape of the first curvilinear groove is different from the shape of the second curvilinear groove.

17. The fishing system of claim 13, wherein the sleeve further comprises a first collar extending around the proximal edge and a second collar extending around the distal edge, wherein the ground support is slidable relative to the sleeve between the first collar and the second collar, and wherein the first collar and the second collar restrict motion of the ground support to prevent the ground support from being separated from the sleeve.

18. The fishing system of claim 13, wherein the at least one peg comprises a first peg near the proximal edge of the sleeve and a second peg near the distal edge of the sleeve.

19. The fishing system of claim 18, wherein, when the sleeve is in the first position, the first peg interconnects with the first curvilinear notch, and the first position is a retracted position for storage.

20. A method of securing the fishing system of claim 1, comprising the steps of:
  providing the fishing system of claim 1;
  sliding the ground support structure from the first position, to the second position; and
  inserting the fishing system into the ground by way of the spike.

* * * * *